(12) United States Patent
Akkiraju et al.

(10) Patent No.: US 7,908,278 B2
(45) Date of Patent: Mar. 15, 2011

(54) RECOMMENDATION SYSTEM FOR ASSISTING MASHUP DEVELOPERS AT BUILD-TIME

(75) Inventors: Rama Kalyani T. Akkiraju, San Jose, CA (US); Hazem Elmeleegy, West Lafayette, IN (US); Richard Thomas Goodwin, Dobbs Ferry, NY (US); Anca-Andreea Ivan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 12/027,315

(22) Filed: Feb. 7, 2008

(65) Prior Publication Data

US 2009/0204594 A1    Aug. 13, 2009

(51) Int. Cl.
 *G06F 7/00* (2006.01)
(52) U.S. Cl. ......... 707/748; 707/766; 715/700; 715/764
(58) Field of Classification Search .................. None
 See application file for complete search history.

(56) References Cited

U.S. PATENT DOCUMENTS

| | | | |
|---|---|---|---|
| 6,381,598 B1* | 4/2002 | Williamowski et al. | 707/999.005 |
| 7,035,944 B2* | 4/2006 | Fletcher et al. | 709/250 |
| 2002/0065802 A1* | 5/2002 | Uchiyama | 707/1 |
| 2003/0046201 A1* | 3/2003 | Cheyer | 705/35 |
| 2004/0139154 A1 | 7/2004 | Schwarze | |
| 2006/0123053 A1* | 6/2006 | Scannell, Jr. | 707/104.1 |
| 2006/0155817 A1 | 7/2006 | Desai et al. | |
| 2006/0161513 A1 | 7/2006 | Drumm et al. | |
| 2007/0118802 A1 | 5/2007 | Gerace et al. | |
| 2007/0156622 A1* | 7/2007 | Akkiraju et al. | 706/48 |
| 2008/0256561 A1* | 10/2008 | Tang et al. | 719/328 |
| 2009/0037832 A1* | 2/2009 | Falchuk et al. | 715/764 |
| 2009/0094525 A1* | 4/2009 | Coelius et al. | 715/741 |

FOREIGN PATENT DOCUMENTS

JP    2006302271    11/2006

OTHER PUBLICATIONS

Ennals et al.; "MashMaker: Mashups for the Masses"; Proceedings of the 2007 AMC SIGMOD international conference; Jun. 12-14, 2007; pp. 1116-1118; Beijing, China.
Spoerri; "Visual Mashup of Text and Media Search Results"; 11th International Conference Information Visualization IV 2007; Jul. 4-6, 2007.
Sabbouh et al.; "Web Mashup Scripting Language"; International World Wide Web Conference: Proceedings of the 16th international conference; May 8-12 2007; pp. 1305-1306; Banff, Alberta, Canada.
Yan; "Build Your Mashup with Web Services"; Services Computing, 2007; IEEE International Conference; pg. xxxiv.

\* cited by examiner

*Primary Examiner* — Khanh B Pham
*Assistant Examiner* — Jieying Tang
(74) *Attorney, Agent, or Firm* — Whitham, Curtis, Christofferson & Cook, P.C.; William Stock (57) ABSTRACT

A recommendation system exploits a repository of mashups to provide design-time assistance to the user through relevant suggestions as to what outputs can be generated along with the best plans to generate those outputs. An output ranker ranks the outputs of the system base on their popularity scores, and a planner uses metric planning algorithms and a configurable utility function. The system takes into account popularity and semantic similarity when recommending services and sources.

8 Claims, 9 Drawing Sheets

RECOMMENDATION SYSTEM FOR ASSISTING MASHUP DEVELOPERS AT BUILD-TIME

BACKGROUND OF THE INVENTION

1. Field of the Invention

The present application generally relates to a tool for generating a Web site that combines content from more than one source into an integrated experience, commonly referred to as a "mashup", and, more particularly, to a recommendation tool which provides design-time assistance to mashup developers.

2. Background Description

Mashup editors, like Yahoo Pipes, Microsoft Popfly, Programmable Web, and IBM's Fusion allow non-programmers to "mash-up" information sources and services to meet their needs. They are designed to provide "situational" applications quickly done by the end user. However, most users will not know what information is available and what they can do with it. During the mashup build process, users are forced to browse large repositories of services and feeds, determine whether those services/feeds are useful without any available semantics, and manually create the links between services.

SUMMARY OF THE INVENTION

According to the present invention, the system exploits a repository of mashups to provide design-time assistance to the user through relevant suggestions as to what outputs can be generated along with the best plans to generate those outputs. The system has four major components: a repository manager, which analyzes the repository of mashups and collects certain information that will later be used by other components in the system, a semantic manager, which provides a semantic similarity score for any pair of terms, an output ranker, which ranks the outputs based on their popularity scores, and a planner, which uses metric planning algorithms and configurable utility function. The system takes into account popularity and semantic similarity when recommending services and sources.

The system of the invention is a recommendation tool which provides design-time assistance to mashup developers, i.e., users. It can be set to be automatically invoked to provide recommendations whenever a change occurs to the partial mashup under development, or to be only invoked upon user request. Whenever an invocation occurs, the recommendation process takes place in two steps. In the first step, the system generates a ranked list of recommended outputs that can be added to the user's mashup. The second step starts when the user picks one of the recommended outputs, where the system then recommends the best plan to generate the selected output starting from the information already present in his or her partial mashup.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
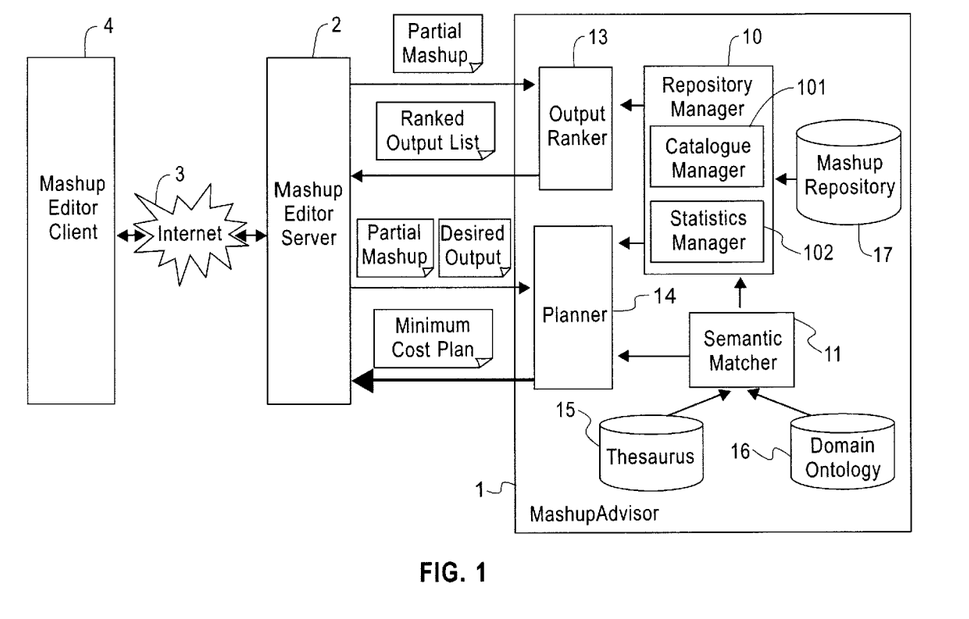
FIG. 1 is a block diagram of the system architecture which implements the present invention.

Referring now to the drawings, and more particularly to FIG. 1, there is illustrated the system architecture of the invention, referred herein as "MashupAdvisor". The MashupAdvisor 1 communicates with a Mashup Editor server 2 which, in turn, communicates via the Internet 3, with a Mashup Editor client 4. A user of the system accesses the MashupAdvisor 1 using the Mashup Editor client. The user interacts with the MashupAdvisor 1 by first choosing a service from a repository of services and drops it on a canvas displayed on the graphic user interface (GUI) of the Mashup Editor client 4. The MashupAdvisor 1 computes a list of possible outputs, given the services displayed on the canvas. The outputs are computed based on the repository of mashups and ranked in the order of their popularity. The user accepts one of the recommended outputs by clicking an "Accept" button displayed on the GUI. When the "Accept" button is clicked, the MashupAdvisor 1 computes the best way of obtaining the desired output. All necessary services are added to the canvas and all required links are automatically created. When this is completed, the canvas contains a new mashup.

The MashupAdvisor 1 includes a repository manager 10, a semantic matcher 11, an output ranker 13, and a planner 14. The repository manager 10 is responsible for answering requests regarding the repository mashups. It has two subcomponents: a catalog manager 101, which keeps track of all the mashups, services, and service outputs in the repository of mashups database 17, and a statistics manager 102, which collects statistics and determines probability distributions for the occurrence of different repository terms and their co-occurrence patterns. The semantic matcher 11 is capable of providing a semantic similarity score for any pair of terms. For this purpose, it can make use of external sources, including domain independent thesaurus database 15 (e.g., wordnet) and domain dependent ontologies database 16 (whenever available). The output ranker 13 and the planner 14 components use the repsository manager 10 and the semantic matcher 11 to generate recommendations.

When the MashupAdvisor 1 is started, the repository manager 10 first analyzes the repository of mashups database 17 and collects certain information that will later be used by other components in the system. A mashup is modeled as a composition of services and information sources, where an information source can be an online feed or just a user supplied input, while a service is defined by its name, inputs and outputs. For each service, the system distinguishes between its formal inputs and its actual inputs. Formal inputs refer to the identities used in the service definition, while actual inputs refer to sources or other service output that are bound to the service's formal inputs in a specific mashup. A term A is denoted $A^f$, $A^a$, or $A^o$ if it is used as a formal input, an actual input, or an output, respectively. If A represents a user supplied input, it is denoted $A^u$. The notation A→B denotes that the term A is bound to term B, where A would be the actual input and B would be the formal input.

The catalogue manager 101 maintains lists of the information sources, services, and service outputs within the repository manager 10. These lists are to be used for the recommendation purposes. The statistics manager 102 collects and maintains statistics about the usage of terms within the repository manager 10. In particular, it maintains the following quantities:

$P(A^a)$: probability that term A is used as an actual input.
$P(A^o)$: probability that term A is used as an output.
$P(A^a|B^o)$: probability that term A is used as an actual input, given that term B is used as an output.
$P(A^o|B^a)$: probability that term A is used as an output, given that term B is used as an actual input.
$P(A \rightarrow B^f | A^o \cup A^u)$: probability that term A is bound to term B, which is a formal input, given that term A is used as an output or a user supplied input.

For the first two non-conditional probabilities, their values are computed for each term A by counting the number of mashups having $A^a$ or $A^o$, respectively, and then dividing those counts by the total number of mashups. To compute the following three conditional probabilities for every pair of terms A and B, the statistics manager counts the number of mashups having $A^a$ and $B^o$, $A^o$ and $B^a$, or $A^o \rightarrow B^f | A^u \rightarrow B^f$ for each of the three probabilities respectively. These three counts are then divided by the count of mashups having $B^o$, $B^a$, or $A^o|A^u$, respectively, to get the final values of the probabilities. Making these calculations require a single scan over all the mashups in the repository, which is performed during the startup of MashupAdvisor 1.

The statistics manager 102 can be configured to take semantics into account when calculating the probabilities. Instead of only counting mashups containing the exact match of a term A, mashups having a semantically similar term A' may be also be counted, but their count will be weighted by the similarity score between A and A'. If the probability calculation involves two terms A and B, then the count of mashups having similar terms A' and B' will be weighted by the product of similarity scores between A and A' and between B and B'. This is best explained by an example.

Example

Consider a repository of ten mashups, where three mashups have the term "zip" used as an actual input, and two other mashups have the term "postalCode" used as an actual input as well. If semantics is taken into account and the semantic similarity between "zip" and "postalCode" is 0.7, then the probability that "zip" is used as an actual input is given by $$P(\text{"zip"}^a) = \frac{3 \times 1 + 2 \times 0.7}{10} = 0.44$$

where 3 and 2 are the counts of the mashups having "zip" and "postalCode" used as an actual input, respectively, while 1 and 0.7 are the assigned weights.

The responsibility of the output ranker 13 is threefold: first, to identify a set of candidate output that can be added to the user's existing partial mashup, then, to assign a relevance score to each candidate output, and finally, to rank the candidate outputs based on their scores. The output ranker 13 selects the candidate outputs as all the service outputs in the repository of mashups database 17, excluding those appearing in the user's partial mashup either in the form of service outputs or in the form of direct user inputs. For each candidate output, the calculated score should reflect the relevance of that output to the terms already existing in the partial mashup. Any of the sources and service outputs in the partial mashup can be used to generate the candidate output, even if it is not currently being used as an actual input. Consequently, if A is the term of the sources output, while $B_1, B_2, \ldots, B_n$ are the terms of the sources and service outputs in the partial mashup, then a suitable scoring function for the output ranker, $S_{or}(A)$, would be $$S_{or}(A) = P\left(A^o \middle| \bigcup_{i=1}^{n} B_i^a\right) \quad (1)$$

In other words, the scoring function is the probability that the term for the candidate output is used as an output given that any of the terms of the sources and service outputs in the partial mashup are used as actual inputs. Note that if the condition in the probability was that all of $B_i$, $i \in [1,n]$ must be used as actual inputs, then the repository may never have enough data to be able accurately calculate the value of the probability. This is why the union operator is used in equation (1), instead of the intersection operator.

In order to simplify the calculation of the scoring function, an independence assumption is made for the actual inputs. In particular, it is assumed that the event that a term A appears as an actual input in a specific mashup is independent from the event that another term B also appears as an actual input in the same mashup. No assumptions are made regarding the relationship between inputs and outputs, which is logical because outputs would normally depend on which inputs exist in the mashup. By applying Baye's rule to equation (1), there results the following:

$$S_{or}(A) = \frac{P(A^o) P\left(\bigcup_{i=1}^{n} B_i^a \middle| A^o\right)}{P\left(\bigcup_{i=1}^{n} B_i^a\right)} \quad (2)$$

But from the inclusion-exclusion principle, the following is obtained:

$$P\left(\bigcup_{i=1}^{n} B_i^a \middle| A^o\right) = \quad (3)$$

$$\sum_{i=1}^{n} P(B_i^a | A^o) - \sum_{1 \leq i_1 < i_2 \leq n} P(B_{i_1}^a \cap B_{i_2}^a | A^o) + \ldots + P\left(\bigcap_{i=1}^{n} B_i^a \middle| A^o\right)$$

Many of the probabilities in equation (3) cannot be obtained from the statistics manager 102, and therefore they require scanning the repository of mashups database 17 each time an output's score is calculated. However, taking the independence assumption into consideration, equation (3) can be re-written as follows:

$$P\left(\bigcup_{i=1}^{n} B_i^a \middle| A^o\right) = \quad (4)$$

$$\sum_{i=1}^{n} P(B_i^a | A^o) - \sum_{1 \le i_1 < i_2 \le n} P(B_{i_1}^a | A^o) P(B_{i_2}^a | A^o) + \ldots + \prod_{i=1}^{n} P(B_i^a | A^o)$$

Similarly, $$P\left(\bigcup_{i=1}^{n} B_i^a \middle| A^o\right) = \sum_{i=1}^{n} P(B_i^a) - \sum_{1 \le i_1 < i_2 \le n} P(B_{i_1}^a) P(B_{i_2}^a) + \ldots + P\left(\prod_{i=1}^{n} P(B_i^a)\right) \quad (5)$$

Note that all the probabilities used in equations (4) and (5) are known to the statistics manager 102. Additionally, since $P(A^o)$ is also known to the statistics manager 102, then the output ranker 13 can avoid performing expensive scans of the repository of mashups database 17 during the calculation of $S_{or}(A)$, as would have been the case had the independence assumption not been made.

It is clear that the number of terms in equations (4) and (5) is exponential in n (the number of sources and services outputs in the user's partial mashup). Therefore, a threshold is defined for n, $n_{max}$, such that if $n > n_{max}$, on the $n_{max}$ most relevant terms in the partial mashup are used in calculating $S_{or}(A)$. The relevance of a term B in the partial mashup to the candidate output A is defined by $P(A^o | B^a)$, which again can be obtained from the statistics manager 102.

Figure 2A:
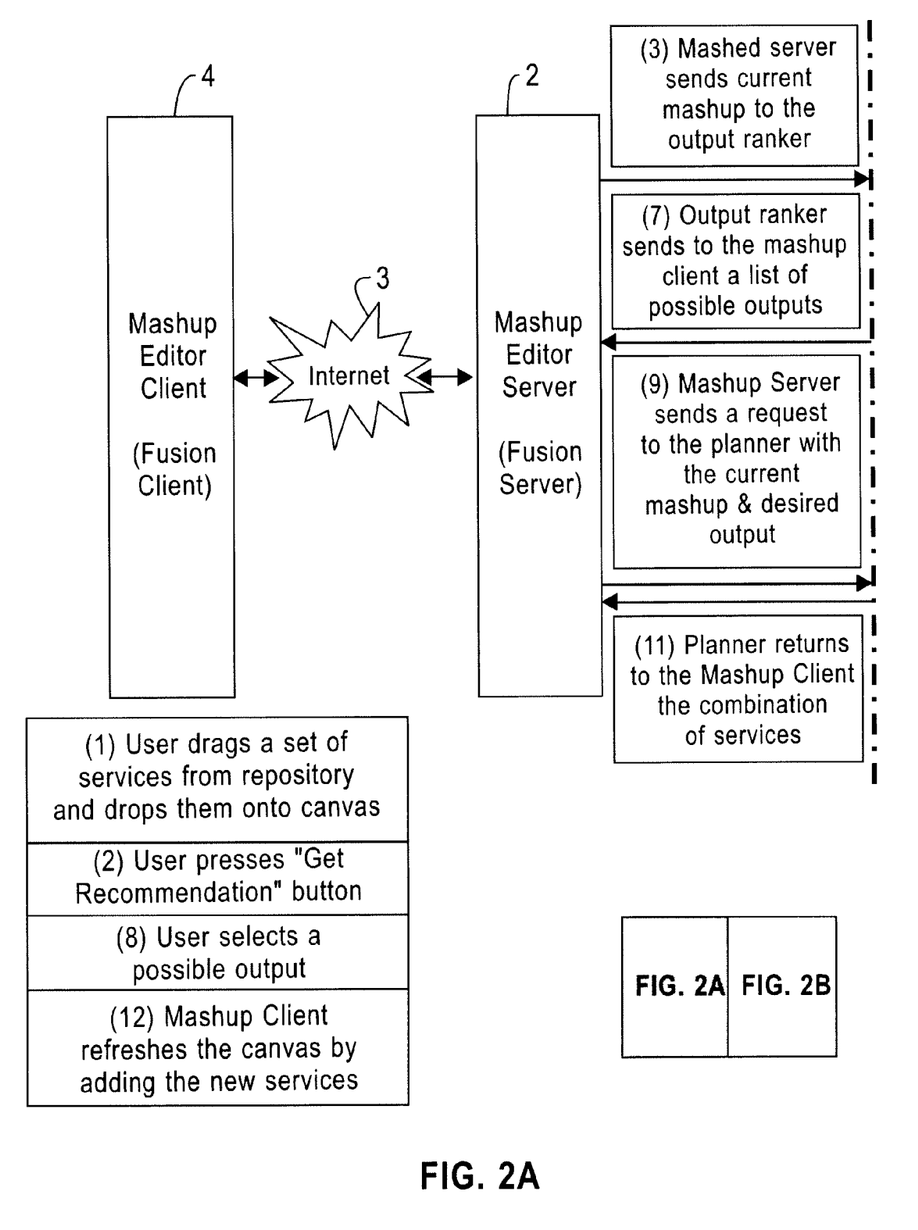
FIGS. 2A and 2B are a block and flow diagram, using the system architecture of FIG. 1, to illustrate the process according to the invention.
Figure 2B:
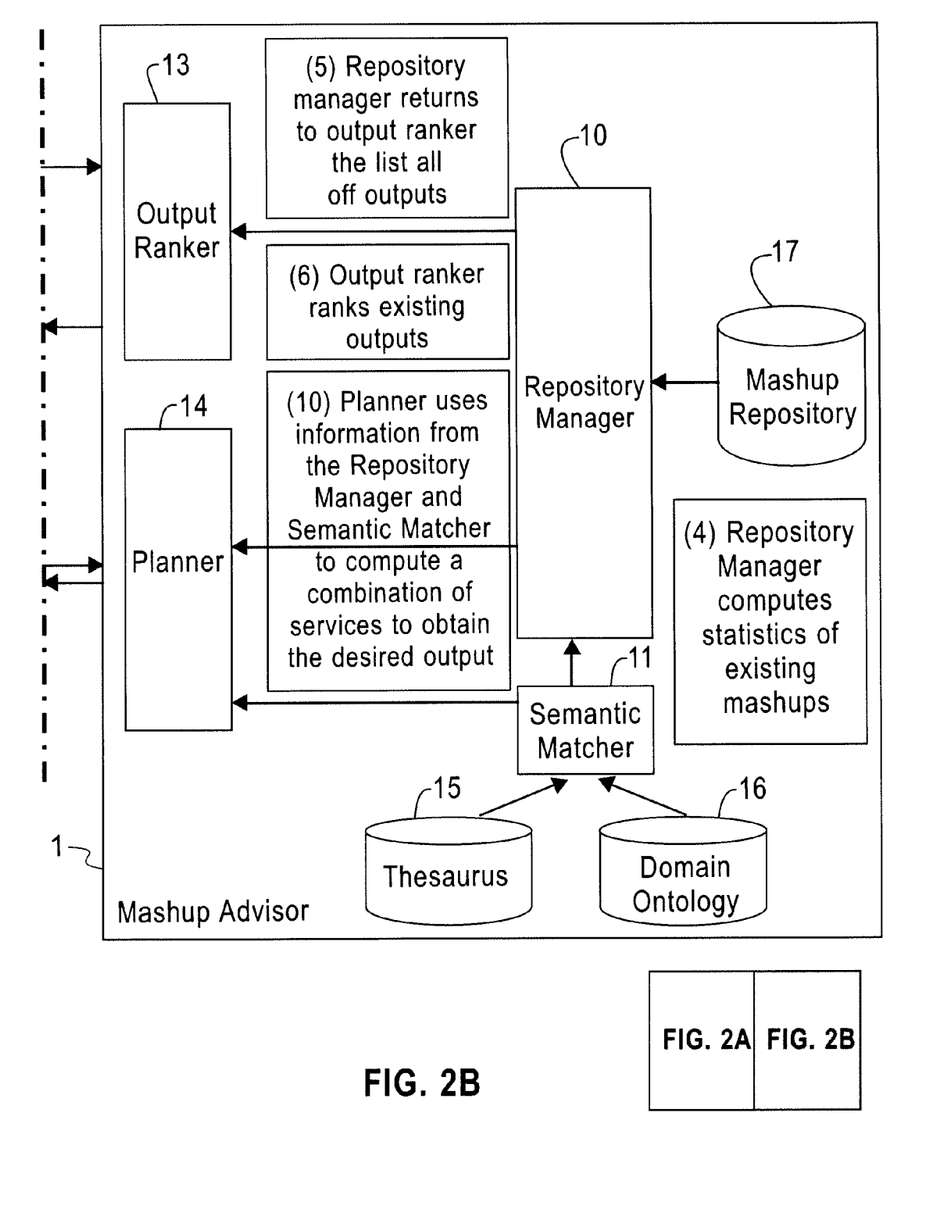

The process described is illustrated in more detail with reference to FIGS. 2A and 2B, which shows the system architecture of FIG. 1 but with the addition of the data flows between components of that architecture. The process begins at step (1) when the user drags a set of services from the repository and drops them onto the canvas. At step (2), the user presses the "Get Recommendation" button. In response at step (3) the mashup editor server 2 sends the current mashup to the output ranker 13. This causes the mashup repository 17 to compute statistics of existing mashups at step (4). Then, at step (5), the mashup repository 17 returns to the output ranker 13 the list of all off outputs. The output ranker 13, in turn, ranks existing outputs at step (6) and then, at step (7) sends to the mashup client a list of possible outputs. At the mashup editor client 4, the user selects a possible output at step (8). In response, the mashup server editor 2 sends a request to the planner with the current mashup and desired output at step (9). Then, at step (10), the planner 14 uses information from the repository manager 10 and the semantic matcher 11 to compute a combination of services to obtain the desired output. The planner 14 then returns to the mashup editor client 2 the combination of services at step (11). Finally, at step (12), the mashup editor client 4 refreshes the canvas by adding the new services.

Figure 3:
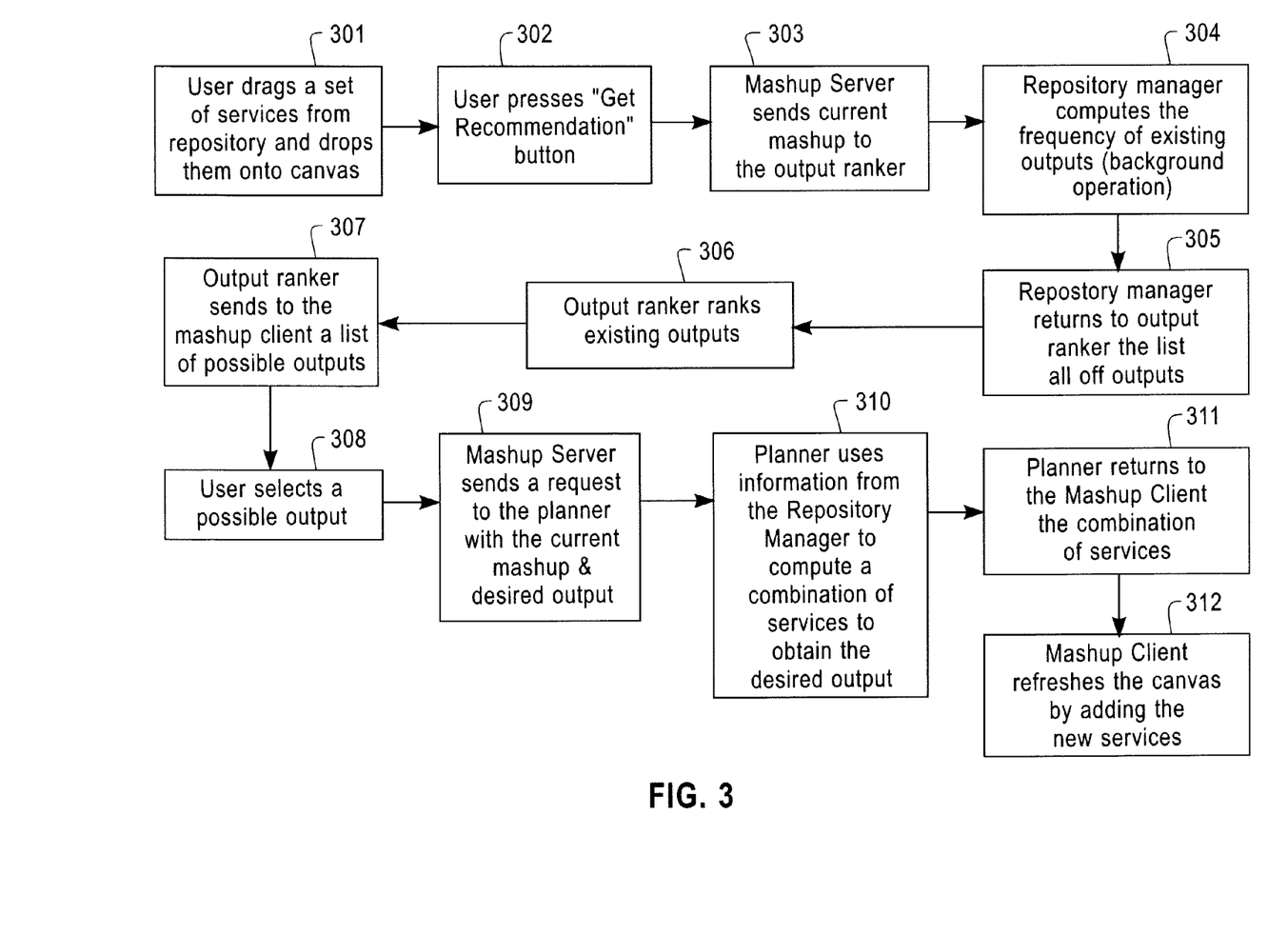
FIG. 3 is a flow diagram illustrating the logic of the overall method implemented by the invention.

The logic of the overall process implemented by the invention is illustrated in FIG. 3. In function block 301, the user drags a set of services from the repository 17 and drops them onto the canvas. Then, in function block 302, the user presses the "Get Recommendation" button on the GUI display. The mashup editor server 2 sends the current mashup to the output ranker 13 in function block 303. In response, the repository manager 10 computes the frequency of existing outputs in a background operation in function block 304. The repository manager 10 returns to the output ranker the list of all off outputs in function block 305. The output ranker 13 ranks the existing outputs in function block 306 and sends a list of possible outputs to the mashup editor client 4 in function block 307. The user is prompted to select a possible output and, when the user selects an output in function block 308, the mashup editor server 2 sends a request to the planner 14 with the current mashup and desired output in function block 309. In response, the planner 14 uses information from the repository manager to compute a combination of services to obtain the desired output in function block 310. Then, in function block 311, the planner 14 returns to the mashup editor client 4 the combination of services in function block 311. Finally, the mashup editor client 4 refreshes the canvas of the GUI by adding the new services in function block 312.

Figure 4:
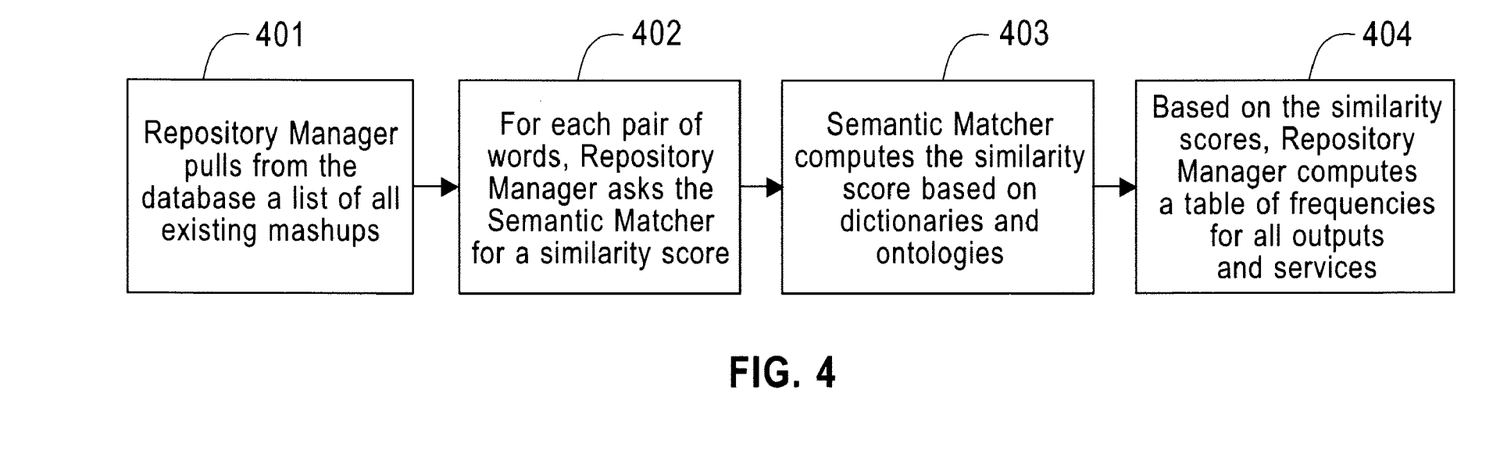
FIG. 4 is a flow diagram illustrating the logic of the repository manager process.

The process of the repository manager 10 is illustrated in more detail in FIG. 4. In function block 401, the repository manager pulls from the mashup repository database 17 a list of all existing mashups. Then, in function block 402, for each pair of words, the repository manager asks the semantic matcher 11 for a similarity score. The semantic matcher computes the similarity scores based on dictionaries and ontologies in function block 403 and returns the scores to the repository manager. Based on the similarity scores, the repository manager computes a table of frequencies for all outputs and services in function block 404.

Figure 5:
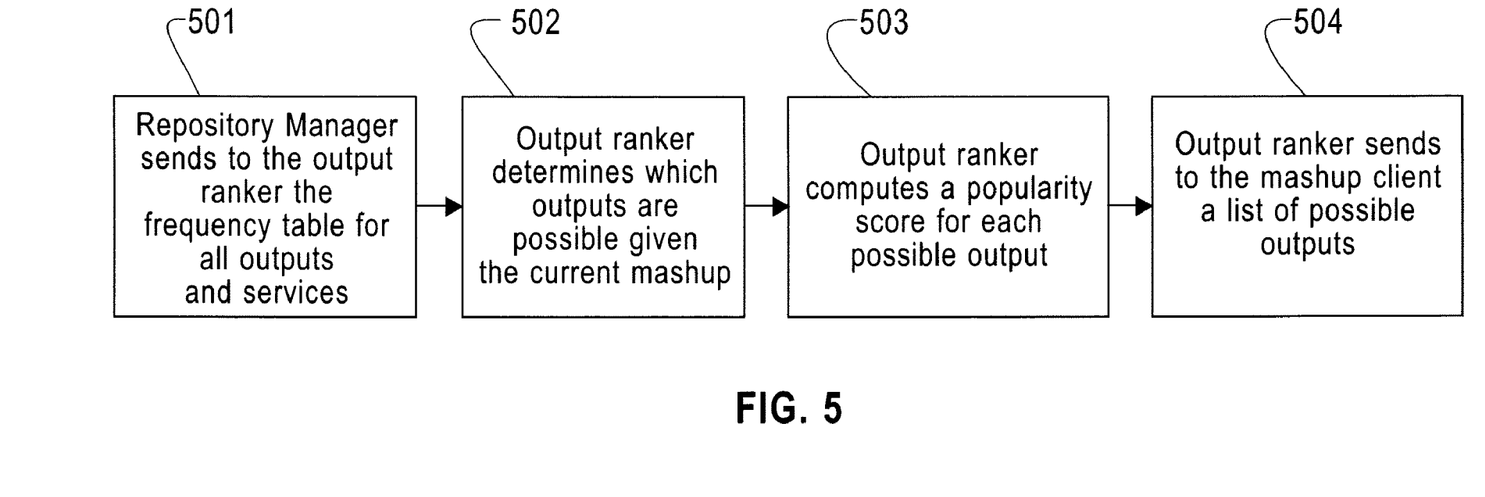
FIG. 5 is a flow diagram illustrating the logic of the output ranker process.

FIG. 5 illustrates in more detail the processes of the output ranker 13. In function block 501, the repository manager 10 sends to the output ranker the frequency table for all outputs and services. The output ranker then determines which outputs are possible given the current mashup in function block 502. The output ranker computes a popularity score for each possible output in function block 503. Then, in function block 504, the output ranker sends the mashup client a list of possible outputs.

Figure 6:
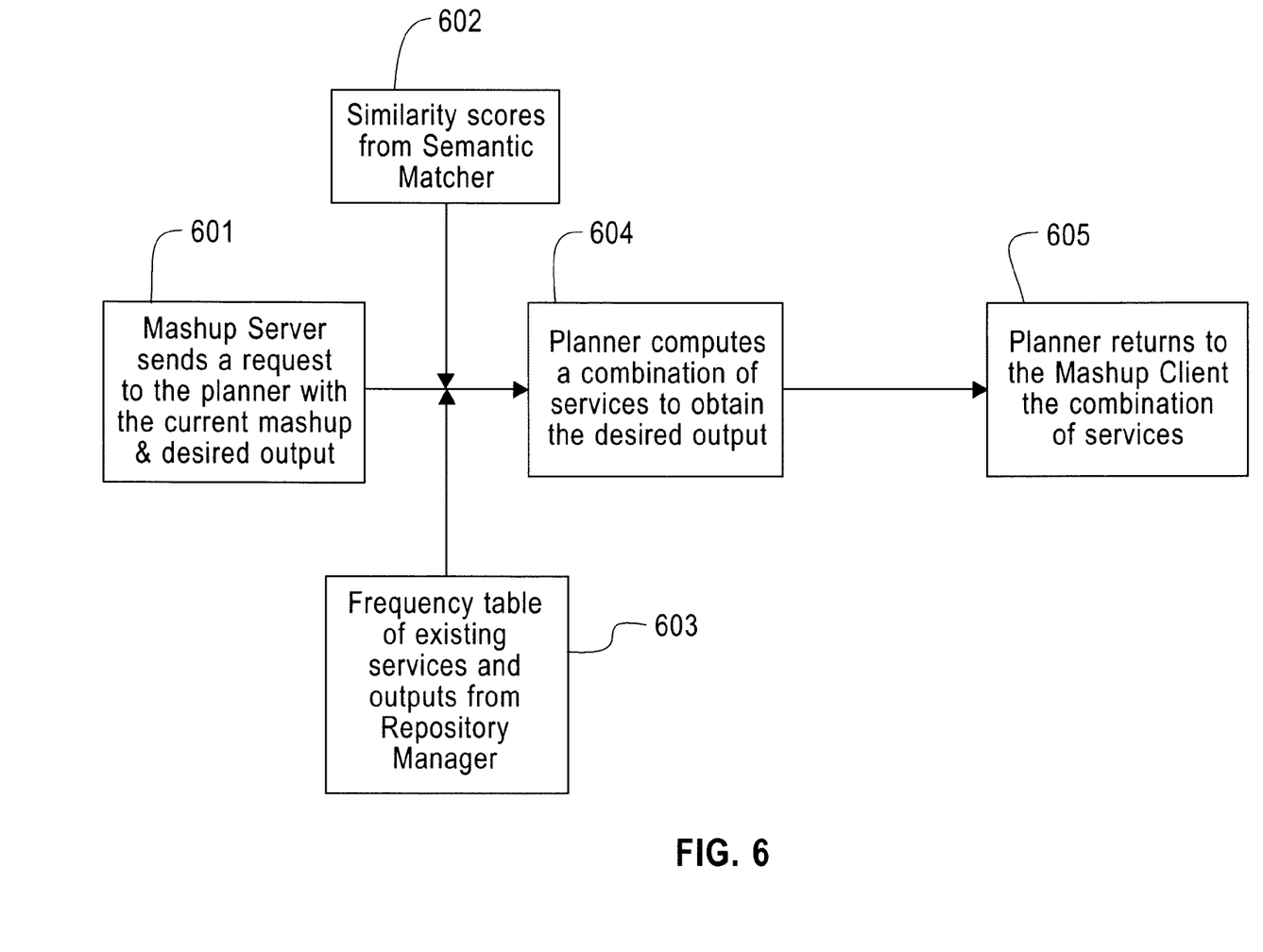
FIG. 6 is a flow diagram illustrating the logic of the planner process.

FIG. 6 illustrates in more detail the processes of the planer 14. The planner receives three inputs: the request from the mashup editor server 2 with the current mashup and desired output at input 601, the similarity scores from the semantic matcher at input 602, and the frequency table of existing services and output from the repository manager 10 at input 603. With these three inputs, the planner computes a combination of services to obtain the desired output in function block 604. The planner then returns to the mashup editor client 4 the combination of services in function block 605.

Figure 7:
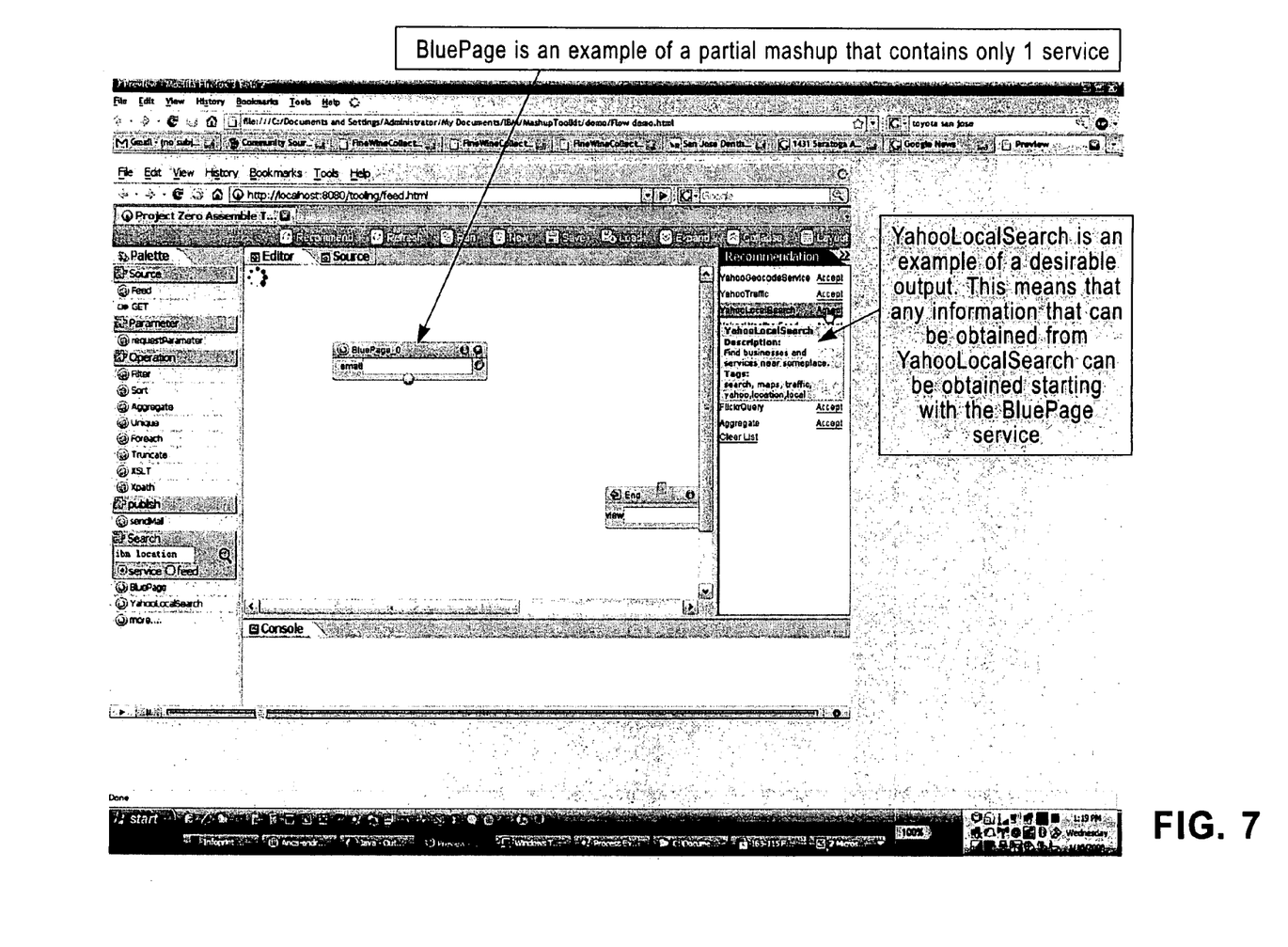
FIG. 7 is a screen print of the Graphical User Interface (GUI) of a preferred embodiment of the invention illustrating a partial mashup containing only one service.
Figure 8:
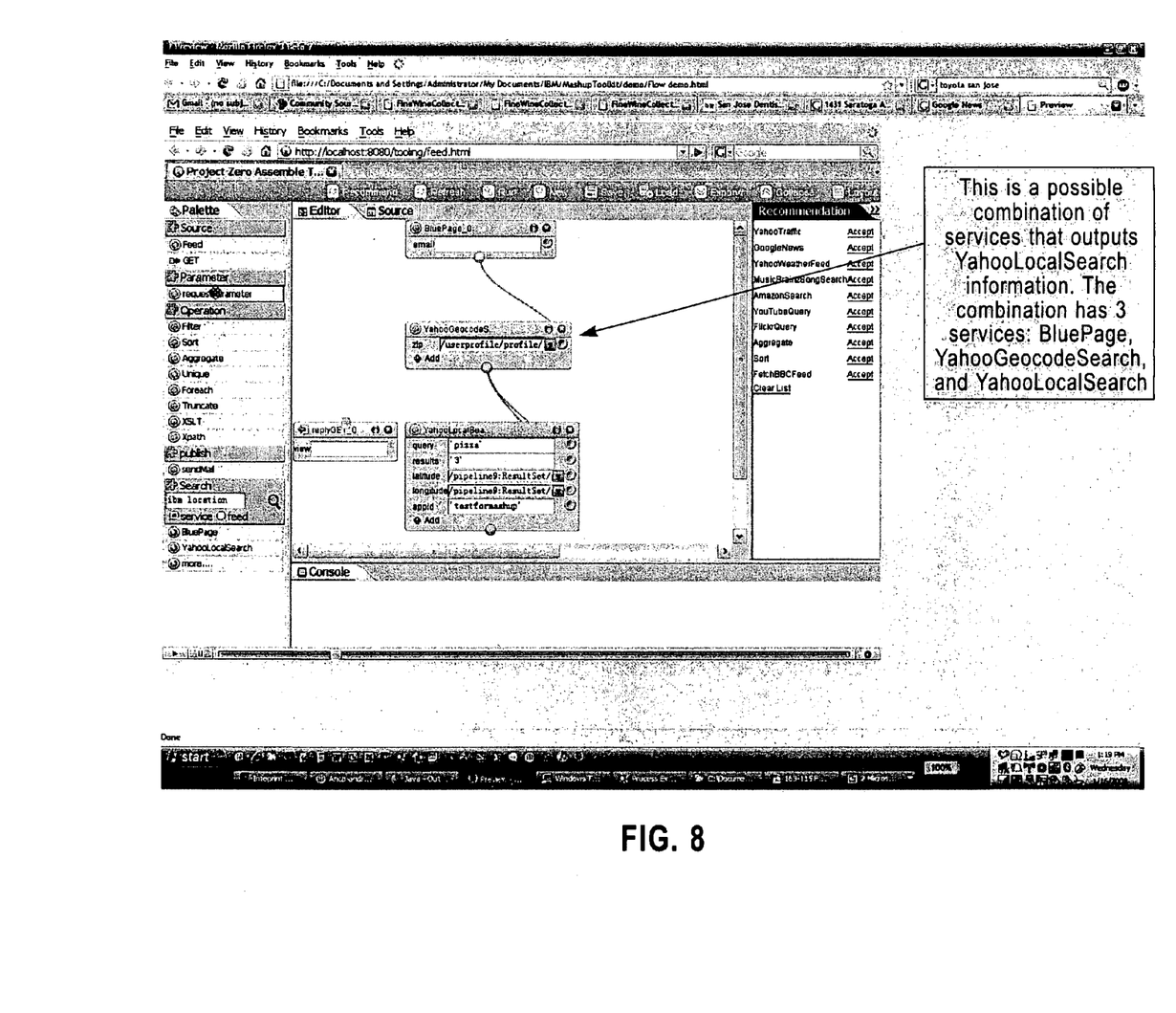
FIG. 8 is a screen print illustrating as possible combination of services.
Figure 9:
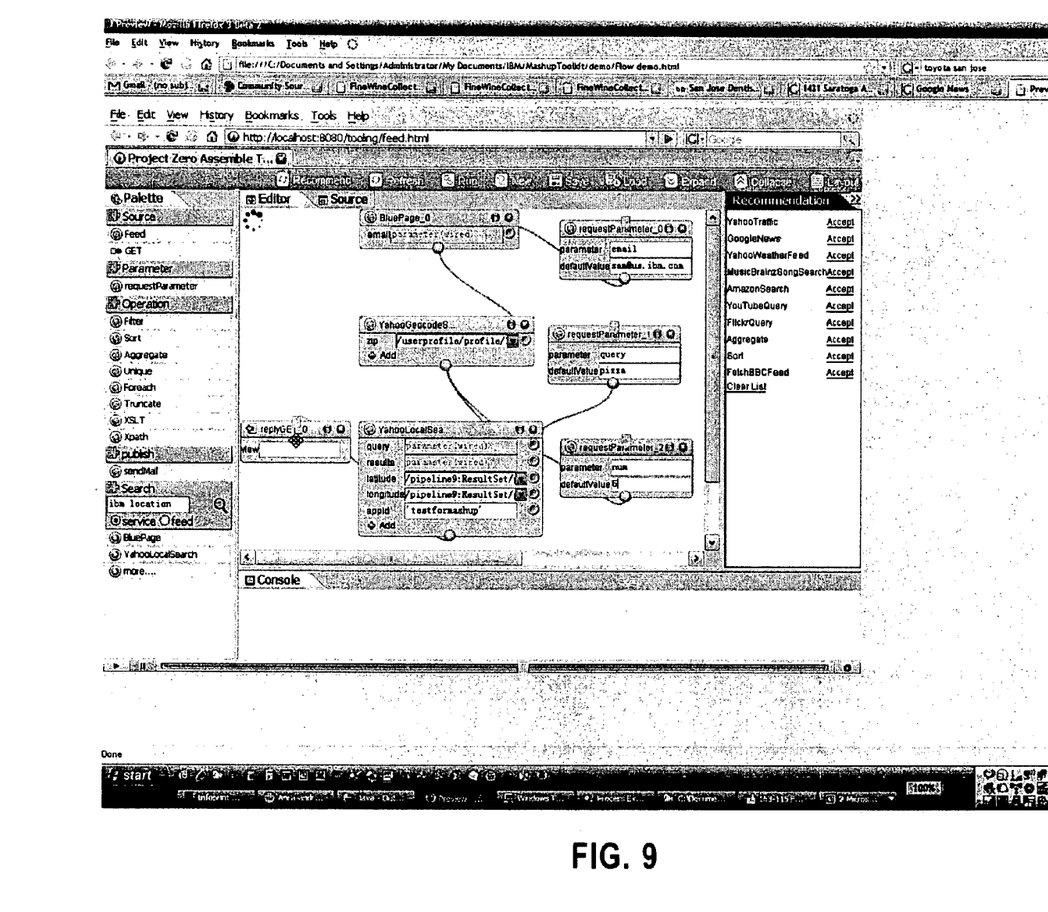
FIG. 9 is a screen print illustrating a complete mashup that was created by the mashup developer using the recommendation engine according to the invention.

To illustrate by way of example the GUI provided to a mashup developer, FIG. 7 is a screen print of the GUI according to a preferred embodiment of the invention. In the illustration of FIG. 7, a partial mashup containing only one service is illustrated on the canvas. In the case illustrated, YahooLocalSearch is an example of a desirable output. In the screen print of FIG. 8, additional services have been added to the canvas. FIG. 9, is a screen print of a complete mashup created by the mashup developer using the recommendation engine.

While the invention has been described in terms of a single preferred embodiment, those skilled in the art will recognize that the invention can be practiced with modification within the spirit and scope of the appended claims.

The invention claimed is:

1. A recommendation system for assisting mashup developers at build time comprising:
   a processor;
   a repository manager analyzes a repository of mashups and pulls from the mashup repository a list of all existing mashups, the repository manager including a catalog manager, which keeps track of all mashups, services and service outputs in the repository of mashups, and a statistics manager, which collects statistics and determines probability distributions for the occurrence of different repository terms and their co-occurrence patterns;

a semantic matcher accesses one or more databases and provides a similarity score upon request of the repository manager for any pair of terms in the list of all existing mashups to the statistics manager, the repository manager then computing a table of frequencies for all outputs and services based on the similarity scores;

an output ranker receives a partial mashup from the mashup developer and generates a ranked output list from the list of all existing mashups provided by the repository manager, excluding outputs appearing in the partial mashup, the output ranker assigns a relevance score to each candidate output, said score reflecting the relevance of the output to any of the terms in the partial mashup, and ranks candidate outputs based on their scores, the ranked candidate outputs being provided as recommended outputs to the mashup developer; and a planner receiving a selected recommended output from the mashup developer and computing a combination of repository services that will produce the selected output, the combination being based on the similarity scores from the semantic matcher and the table of frequencies from the repository manager, the computed combination of repository services being added to the mashup developer's mashup.

2. The recommendation system of claim 1, wherein the mashup developer communicates with the recommendation system through a communication system includes:

a mashup editor client including a graphic user interface (GUI) for displaying a repository of services from which the mashup developer can select services, displaying recommended outputs from the output ranker, one of the displayed recommended outputs being selectable by the mashup developer, and displaying the computed combination of services; and a mashup editor server communicating with the mashup editor client via a network, the mashup editor server providing a partial mashup to the output ranker and receiving a ranked output list from the output ranker, the mashup editor server further providing a partial mashup and desired output to the planer and receiving a computed combination of services from the planner.

3. The recommendation system of claim 1, wherein the relevance score assigned by the output ranker is the probability that the candidate output is output given that any term in the partial mashup is input.

4. The recommendation system of claim 3, wherein the statistics manager is configured to take semantics into account when calculating probabilities.

5. The recommendation system of claim 1, wherein the repository manager computes frequency of existing outputs in a background operation.

6. A method of assisting mashup developers at build time, comprising the steps of:

displaying services in a mashup repository on a graphic user interface (GUI) of a mashup client for selection by a mashup developer, prompting the mashup developer to drag a set of services from the repository and drop them onto a GUI canvas, sending a current mashup to an output ranker, computing by a repository manager of the mashup repository statistics of existing mashups returning to the output ranker a list of all outputs, ranking by the output ranker existing outputs and sending to the mashup client the ranked list of outputs, responding to a selection by the mashup developer from the ranked list of a desired output by sending a request to a planner with the current mashup and the desired output, using by the planner information from the repository manager and a semantic matcher to compute a combination of services to obtain the desired output, returning to the mashup client by the planner the combination of services, and refreshing by the mashup client the canvas of the GUI by adding the combination of services, wherein the step of computing by the repository manager of statistics of existing mashups comprises the steps of:

pulling a list of existing mashups from a database, for each pair of words, requesting a similarity score from the semantic matcher, and based on similarity scores returned by the semantic matcher, computing a table of frequencies for all outputs and services, and wherein the step of ranking by the output ranker of existing outputs comprises the steps of:

receiving from the repository manager the table of frequencies, computing a relevance score for each output, the ranking reflecting the relevance of the output to any of the terms in the current mashup, and sending to the mashup client a list of all outputs, excluding outputs appearing in the current mashup.

7. The method of assisting mashup developers of claim 6, wherein the relevance score assigned by the output ranker is the probability that the candidate output is output given that any term in the current mashup is input.

8. The method of assisting mashup developers of claim 7, wherein the statistics manager is configured to take semantics into account when calculating probabilities.

* * * * *